United States Patent
Kozawa

(10) Patent No.: US 9,692,562 B2
(45) Date of Patent: Jun. 27, 2017

(54) COMMUNICATION APPARATUS AND COMMUNICATION METHOD

(71) Applicant: DENSO CORPORATION, Kariya, Aichi-pref. (JP)

(72) Inventor: Takaharu Kozawa, Kariya (JP)

(73) Assignee: DENSON CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/086,601

(22) Filed: Mar. 31, 2016

(65) Prior Publication Data

US 2016/0294534 A1 Oct. 6, 2016

(30) Foreign Application Priority Data

Apr. 3, 2015 (JP) .................................. 2015-76855

(51) Int. Cl.
| | |
|---|---|
| *H04L 7/04* | (2006.01) |
| *H04L 5/00* | (2006.01) |
| *H04L 7/06* | (2006.01) |
| *H04L 25/49* | (2006.01) |
| *H04Q 9/04* | (2006.01) |

(52) U.S. Cl.
CPC ................ *H04L 5/00* (2013.01); *H04L 7/06* (2013.01); *H04L 25/49* (2013.01); *H04Q 9/04* (2013.01)

(58) Field of Classification Search
None
See application file for complete search history.

(56) References Cited

U.S. PATENT DOCUMENTS

| | | | | |
|---|---|---|---|---|
| 4,159,462 | A * | 6/1979 | Rocha | G01S 7/52026 367/105 |
| 5,530,298 | A * | 6/1996 | Gerhold | G01F 15/066 307/106 |
| 8,699,371 | B2 | 4/2014 | Reidl et al. | |
| 2013/0343472 | A1* | 12/2013 | Scherr | H04L 5/1484 375/259 |
| 2015/0131683 | A1* | 5/2015 | de Ruijter | G06F 13/4295 370/514 |

* cited by examiner

*Primary Examiner* — Wednel Cadeau
(74) *Attorney, Agent, or Firm* — Knobbe, Martens, Olson & Bear, LLP

(57) ABSTRACT

A communication apparatus includes an output portion and a controller. The output portion outputs an output signal. The output signal includes a synchronization signal, a data signal, and an end signal in this order. The controller includes a measuring portion that measures a length of a received pulse, a signal determiner that determines whether the received pulse corresponds to the synchronization signal based on the length of the received pulse, and a signal acquisition portion. The signal acquisition portion skips the received pulse in a case where the signal determiner determines that the received signal does not include the synchronization signal. The signal acquisition portion considers the received signal as the synchronization signal and reads a pulse following the received pulse to the end signal in a case where the signal determiner determines that the received signal includes the synchronization signal.

10 Claims, 7 Drawing Sheets

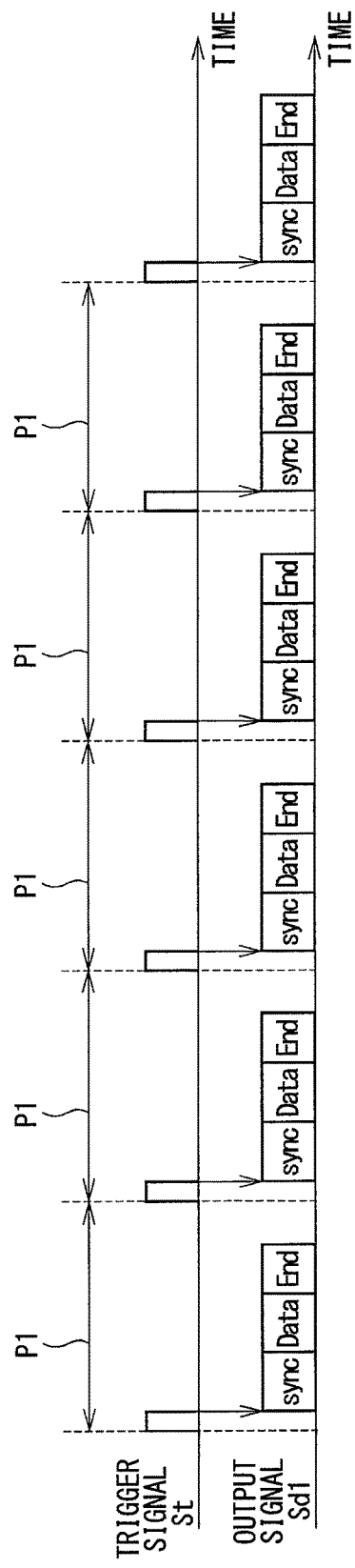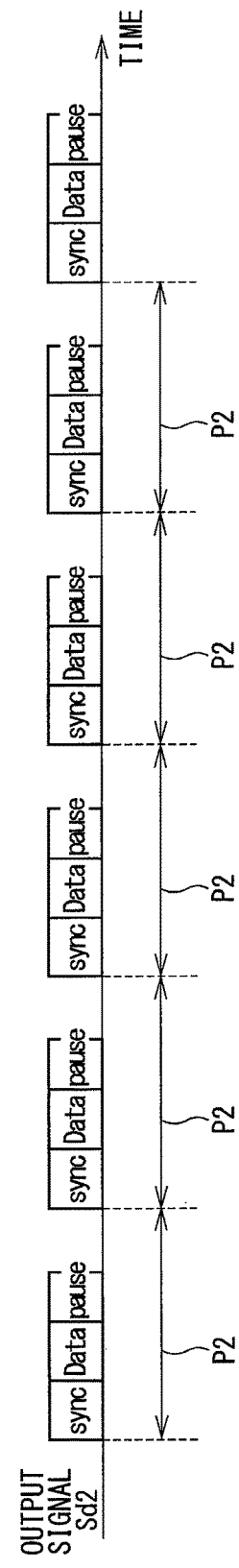

COMMUNICATION APPARATUS AND COMMUNICATION METHOD

CROSS REFERENCE TO RELATED APPLICATION

This application is based on Japanese Patent Application No. 2015-76855 filed on Apr. 3, 2015, the disclosure of which is incorporated herein by reference.

TECHNICAL FIELD

The present disclosure relates to a communication apparatus and a communication method.

BACKGROUND

Patent literature 1: U.S. Pat. No. 8,699,371 B2

A system that acquires information from a sensor or the like has been known. For example, Patent literature 1 outputs a signal from a master side to a slave side. According to the signal, data is transmitted from the slave side to the master side.

The inventor of the present disclosure has found the following.

Patent literature 1 performs a signal transmission from the master to the slave and a data transmission from the slave to the master by using the common wiring. In this case, a microcomputer or the like in the master may read a request signal that requests the slave to perform the data transmission as well as the data signal, the request signal being transmitted from the master to the slave.

SUMMARY

It is an object of the present disclosure to provide a communication apparatus and a communication method that can suitably acquire a signal transmitted from an output portion in the communication apparatus.

According one example of the present disclosure, a communication apparatus comprises an output portion and a controller. The output portion outputs an output signal, in which the output signal includes a synchronization signal which synchronizes clocks, a data signal which is outputted after the synchronization signal, and an end signal which is outputted after the data signal and indicates a termination of a series of signals in this order. The controller that includes a measuring portion that measures a length of a received pulse that is received by the controller, a signal determiner that determines based on the length of the received pulse whether the received pulse corresponds to the synchronization signal, and a signal acquisition portion. The signal acquisition portion skips the received pulse in a case where the signal determiner determines that the received signal does not include the synchronization signal, and considers the received signal as the synchronization signal and reads a pulse following the received pulse to the end signal in a case where the signal determiner determines that the received signal includes the synchronization signal.

According to another example of the present disclosure, a communication method that acquires an output signal from an output portion that outputs a synchronization signal which synchronizes clocks, a data signal which is outputted after the synchronization signal, and an end signal which is outputted after the data signal and indicates a termination of a series of signal as the output signal in this order is provided. The communication method comprises: measuring a length of a received pulse received; determining whether the received pulse includes the synchronization signal based on the length of the received pulse; skipping the received pulse in a case where the received pulse is determined not to be the synchronization signal; and considering a pulse following the received pulse to the end signal as the output signal and reads the pulse following the received pulse to the end signal in a case where the received pulse is determined to be the synchronization signal.

According to the present disclosure, a synchronous signal is transmitted before transmission of a data signal. By using this feature, it is determined whether the received pulse corresponds to the synchronous signal or not based on the pulse length. When determined that the received pulse does not correspond to the synchronous signal, the received signal is skipped. Accordingly, it may be possible to properly skip a noise and a signal that is unnecessary to read, such as a trigger signal. It may be possible to properly acquire an output signal. In addition, it may be possible to prevent an error from occurring by reading the unnecessary signal and the noise and to properly maintain communication. Further, in comparison with a case where an unnecessary signal and a noise are not acquired by using switchover of an input and output portion, it may be possible to reduce a load on a controller.

BRIEF DESCRIPTION OF THE DRAWINGS

The above and other objects, features and advantages of the present disclosure will become more apparent from the following detailed description made with reference to the accompanying drawings. In the drawings:

FIG. 8A is a timing chart illustrating the output signal of the first embodiment; and FIG. 8B is a timing chart illustrating an output signal of a second embodiment.

DETAILED DESCRIPTION

Figure 1:
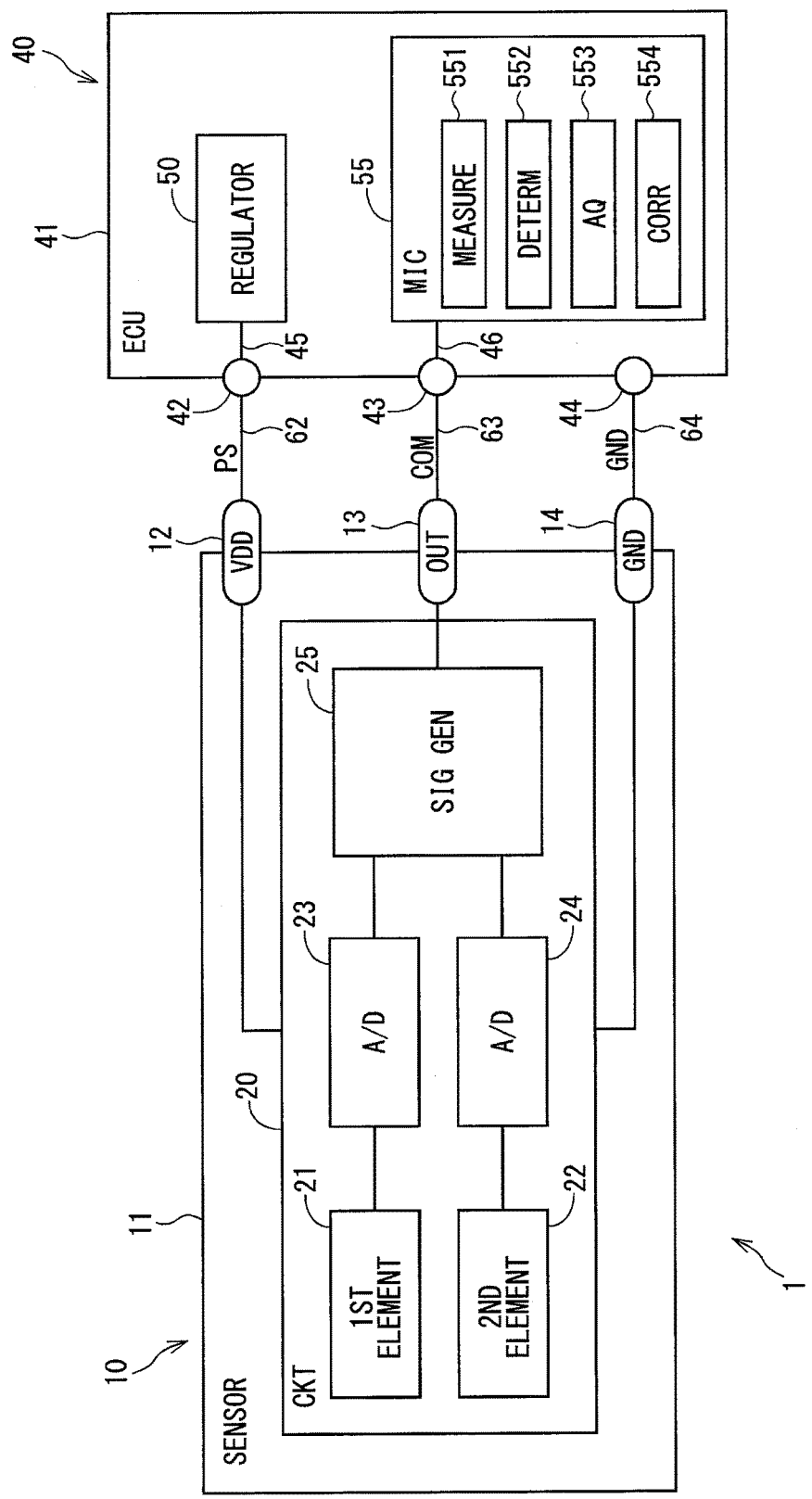
FIG. 1 is a block diagram showing a configuration of a communication apparatus in a first embodiment of the present disclosure.

A communication apparatus and a communication method of the present disclosure will be explained with referring to the drawings. The identical symbol will be given to the substantially identical element in multiple embodiments, and an explanation will be omitted.

First Embodiment

A communication apparatus and a communication method according to the first embodiment of the present disclosure are described in FIG. 1 to FIG. 7.

As illustrated in FIG. 1, a communication apparatus 1 includes a sensor 10 that corresponds to an output portion, and an ECU 40 that corresponds to a controller. The communication apparatus 1 is applied to, for example, an electric power steering apparatus mounted to a vehicle in order to assist steering by a driver. A communication system between the sensor 10 and the ECU 40 is defined as a SENT communication, for example. Incidentally, "SENT" represents single edge nibble transmission. In the SENT communication, a data is expressed with a time width from a falling (also referred to as a falling edge) of one pulse that is outputted from the sensor 10 to a falling of another pulse that is also outputted from the sensor 10.

The sensor 10 of the present embodiment detects steering torque. More in detail, the sensor 10 detects the variation of magnetic field according to the torsion displacement amount of a torsion bar connecting an input axis provided in a steering wheel side (not shown) and an output axis provided in a wheel side (not shown), so that the sensor 10 detects the steering torque.

The sensor 10 includes a housing 11 and a circuit 20.

The housing 11 is provided with a power source terminal 12, a communication terminal 13, and a ground terminal 14. The housing 11 includes the circuit 20 inside.

The power source terminal 12 is connected to a regulator 50 in the ECU 40 through a power source line 62 and a power source terminal 42 of the ECU 40. The communication terminal 13 is connected to the microcomputer 55 in the ECU 40 through a communication line 63 and a communication terminal 43 of the ECU 40. The ground terminal 14 is connected to the ground inside the ECU 40 through a ground line 64 and a ground terminal 44 of the ECU 40.

The circuit 20 is configured from a semiconductor chip. The circuit 20 includes a first sensor element 21, a second sensor element 22, A/D conversion circuits 23, 24, and a signal generation circuit 25. The A/D conversion circuit represents an analog/digital conversion circuit.

The first sensor element 21 and the second sensor element 22 each includes a magnetism detection element that detects the variation of magnetic field according to a torsion displacement of the torsion bar. The first sensor element 21 and the second sensor element 22 each includes a Hall element. Incidentally, the first sensor element 21 and the second sensor element 22 are substantially the same.

The A/D conversion circuit 23 performs an A/D conversion to a detection signal of the first sensor element 21. In other words, the A/D conversion circuit 23 A/D converts the detection signal of the first sensor element 21. The A/D conversion circuit 24 performs an A/D conversion to a detection signal of the second sensor element 22.

The signal generation circuit 25 generates an output signal Sd1 that includes a data signal. The data signal corresponds to the A/D-converted detection signal of the first sensor element 21 and the A/D-converted detection signal of the second sensor element 22. The generated output signal Sd1 is outputted to the ECU 40 through the communication terminal 13 and the communication line 63. The detail of the output signal Sd1 will be described below.

The ECU 40 has a housing 41, a regulator 50, and the microcomputer 55.

The housing 41 is provided with a power source terminal 42, a communication terminal 43, and a ground terminal 44. The housing 41 includes the regulator 50 and the microcomputer 55 inside.

The power source terminal 42 is connected to the regulator 50 through the internal power source line 45 inside ECU 40. The power source line 62 connects the power source terminal 42 of the ECU 40 with the power source terminal 12 of the sensor 10.

The communication terminal 43 is connected to the microcomputer 55 through the internal communication line 46 inside the ECU 40. The communication line 63 connects the communication terminal 43 of the ECU 40 with the communication terminal 13 of the sensor 10. As described in FIG. 2, the internal communication line 46 is connected to the internal power source line 45 through a pull-up resistor 57.

The ground terminal 44 is connected to the ground inside the ECU 40. The ground terminal 44 of the ECU 40 and the ground terminal 14 of the sensor 10 are connected through the ground line 64.

The regulator 50 adjusts electric power supplied from a power source (not shown) to a predetermined voltage (for example, 5 V). The power adjusted to the predetermined voltage is supplied to the sensor 10 through the power source line 62, and is supplied to the interior of the microcomputer 55 such as the ECU 40.

The microcomputer 55 performs various calculations based on the output signal Sd1, which is outputted through the communication line 63 from the communication terminal 13 of the sensor 10. The microcomputer 55 has, as functional blocks, a measuring portion 551, a signal determination portion 552, a signal acquisition portion 553, and a correction portion 554. The correction portion 554 corresponds to an example of a corrector.

The measuring portion 551 measures a pulse length Lp of a pulse inputted into the microcomputer 55. In the present embodiment, a period from the falling of one pulse to the falling of another pulse is defined as a pulse length Lp.

The signal determination portion 552 determines whether a received pulse corresponds to a synchronization signal or not based on the pulse length Lp inputted after receiving an end signal.

The signal acquisition portion 553 reads a series of signals from the synchronization signal to the end signal as the output-signal Sd1.

The correction portion 554 corrects each signal included in the output signal Sd1, and calculates an actual data.

The detail of each processing by the microcomputer 55 will be described later.

Figure 2:
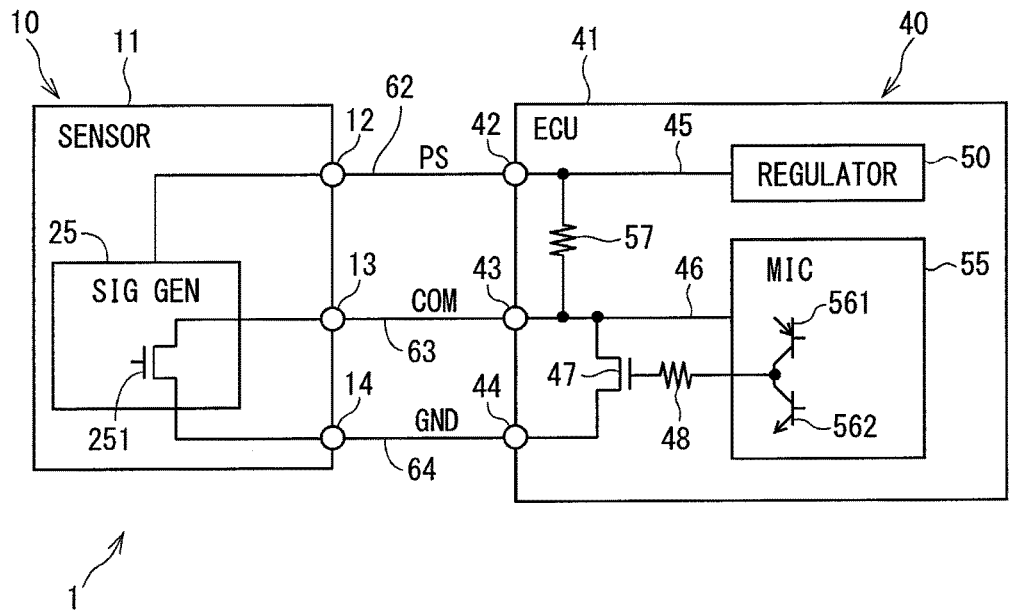
FIG. 2 is a schematic block diagram showing an electrical configuration of the communication apparatus in the first embodiment.
Figure 3A:
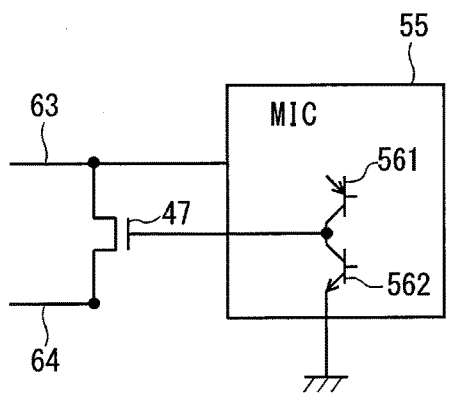
FIG. 3A is a diagram illustrating a trigger signal generation portion of the first embodiment.
Figure 3B:
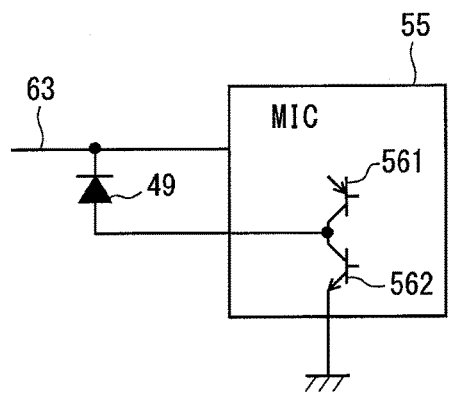
FIG. 3B is a diagram illustrating another trigger signal generation portion of the first embodiment.

The electrical configuration of the communication apparatus 1 is illustrated in FIG. 2. As described in FIG. 2, the descriptions of the first sensor element 21, the second sensor element 22, and the A/D conversion circuits 23, 24 are omitted regarding the sensor 10.

As illustrated in FIG. 2, the signal generation circuit 25 has a signal transistor 251. In the signal transistor 251, a drain terminal is connected to the communication line 63 and a source terminal is connected to the ground line 64. Incidentally, a capacitor, a resistor, a Zener diode or the like may be connected between the signal transistor 251 and the communication terminal 13 and/or between the signal transistor 251 and the ground terminal 14, appropriately. Voltage according to voltage supplied from the power source terminal 12 is outputted to the ECU 40 through the communication line 63 when the signal transistor 251 turns off. The voltage decreases and the ground voltage is outputted to the ECU 40 through the communication line 63, when the signal transistor 251 turns into on.

The ECU 40 has a trigger signal generation portion 47 for generating a trigger signal St. A trigger signal generation portion may also be referred to as a trigger signal generator. The trigger signal generation portion 47 is configured from a transistor. In the trigger signal generation portion 47, a drain is connected to the internal communication line 46 and the microcomputer 55, and a source is connected to the ground. Further, a gate of the trigger signal generation portion 47 is connected to a connection point of transistors 561, 562 through a gate resistor 48. The transistors 561, 562 are provided to the inside of the microcomputer 55.

In the present embodiment, the source of the trigger signal generation portion 47 is connected to the ground outside the microcomputer 55. As described in FIG. 3A, the source may be connected to the ground inside the microcomputer 55 through the transistor 562. Alternatively, as described in FIG. 3B, instead of the trigger signal generation portion 47 configured from a transistor, a trigger signal generation portion 49 configured from a diode may be used. Regarding the trigger signal generation portion 49, as described in FIG. 2, a gate may be connected to the ground outside the microcomputer 55.

The trigger signal generation portion 47 turns on at the time when the output signal Sd1 is obtained from the sensor 10. When the trigger signal generation portion 47 turns on, the voltage of the internal communication line 46 that is pulled up by the pull-up resistor 57 and the communication line 63 drops, and becomes equal to the ground voltage. The sensor 10 recognizes this voltage drop as the trigger signal St. When the sensor 10 detects the trigger signal St, the sensor 10 outputs the output signal Sd1 to the ECU 40. In the present embodiment, the pulse length Lp_t of the trigger signal St is set to 50 microseconds (μsec) as an example.

In the present embodiment, the trigger signal generation portion 47 turns on at a predetermined cycle according to instructions from the microcomputer 55 based on a timer inside the ECU 40. Thus, the trigger signal St is generated at the predetermined cycle, and the sensor 10 outputs the output signal Sd1. Therefore, it may be possible for the microcomputer 55 to obtain the output signal Sd1 from the sensor 10 at the predetermined cycle.

Figure 4:
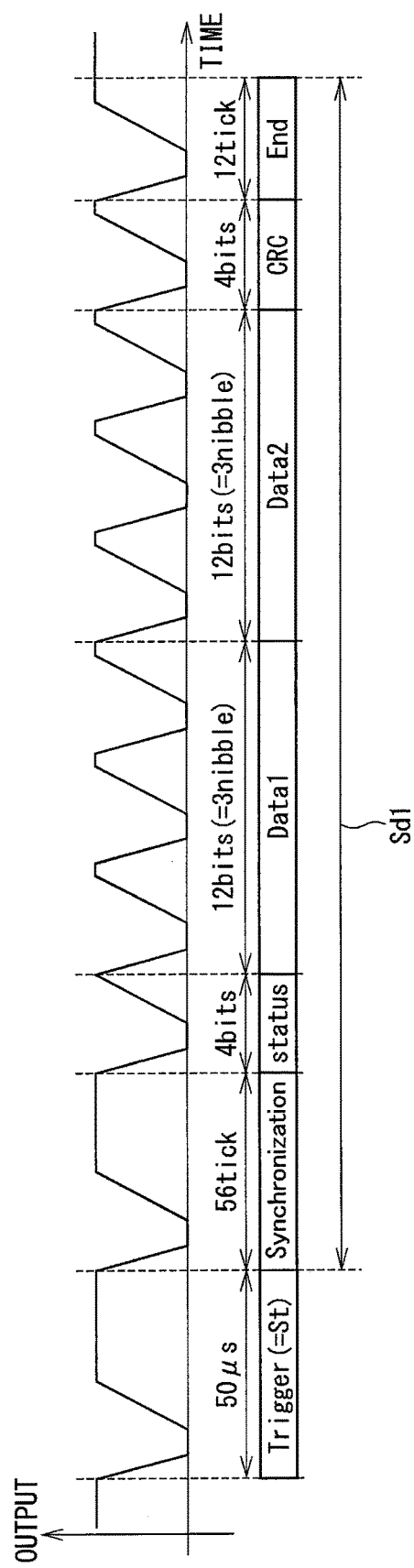
FIG. 4 is a timing chart illustrating an output signal of the first embodiment.
Figure 7:
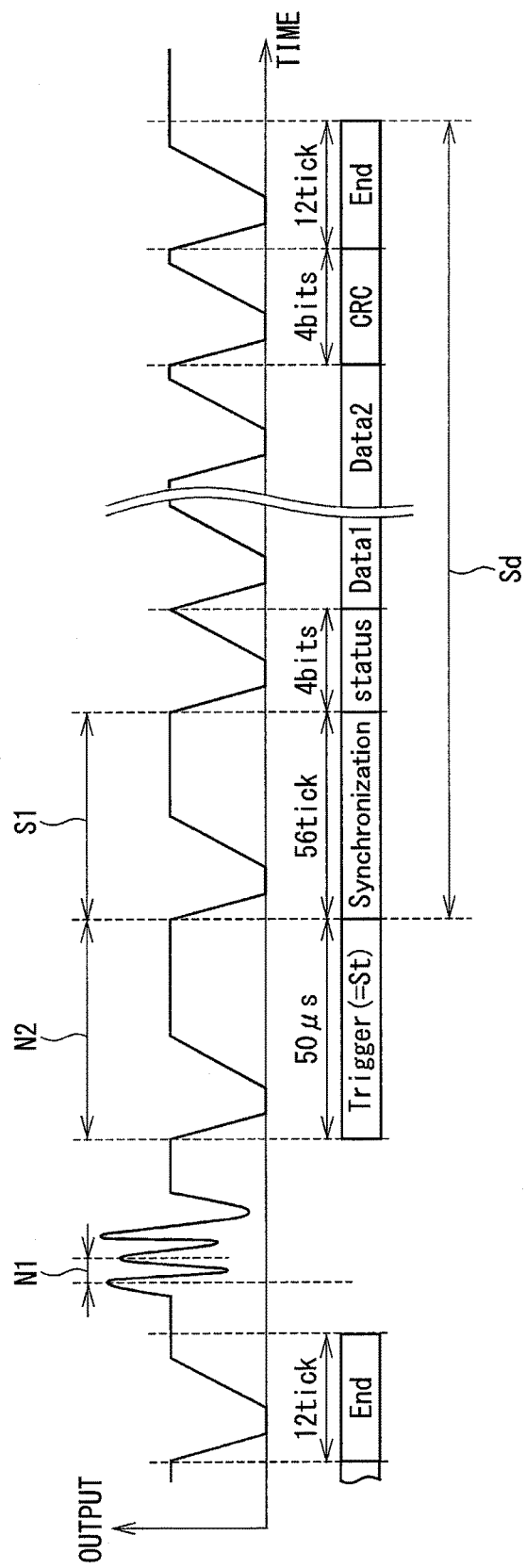
FIG. 7 is a timing chart illustrating the communication processing of the first embodiment.

The detail of the output signal Sd1 will be explained by referring to FIG. 4. Incidentally, the number of bits or the like described in FIG. 4 is an example, and the number of bits or the like may be decided appropriately according to a communication standard for example. Further, it should be noticed that a pulse in FIG. 4 is schematically illustrated. Thus, the pulse lengths of signals in FIG. 4 does not necessarily coincide with actual length. FIG. 7 is also a schematic illustration.

As described in FIG. 4, the output signal Sd1 includes the synchronization signal, a state signal, a first data signal, a second data signal, a CRC signal, and an end signal in this order. Incidentally, the output signal Sd1 is a series of signals to be outputted after the sensor 10 receives the trigger signal St. The end signal corresponds to a termination signal. In the present embodiment, the first data signal and the second data signal correspond to the data signal.

The synchronization signal is a signal for synchronizing clocks of the sensor 10 and the ECU 40. The synchronization signal is set to 56 ticks in the present embodiment. In the present embodiment, it is defined that a tick corresponding time equal to one tick is set to three microseconds (that is, 1 tick=3 microseconds). Thus, the pulse length Lp_s of the synchronization signal is equal to 168 microseconds. That is, the pulse length Lp_s of the synchronization signal (being equal to 168 microseconds) is different from the pulse length Lp_t of the trigger signal St (being equal to 50 microseconds).

The first data signal is a signal according to the detection signal of the first sensor element 21. The second data signal is the signal according to a detection signal of the second sensor element 22. In the present embodiment, the first data signal and the second data signal respectively are equal to 3 nibbles (being equal to 12 bits), and have a total of 6 nibbles as a data portion as described in FIG. 4. Contents of data with 1 nibble or more nibbles can be used, and are determined according to a communication specification.

After the sensor 10 outputs the end signal and before receiving a subsequent trigger signal St, the sensor 10 does not output the output signal Sd1.

Figure 5A:
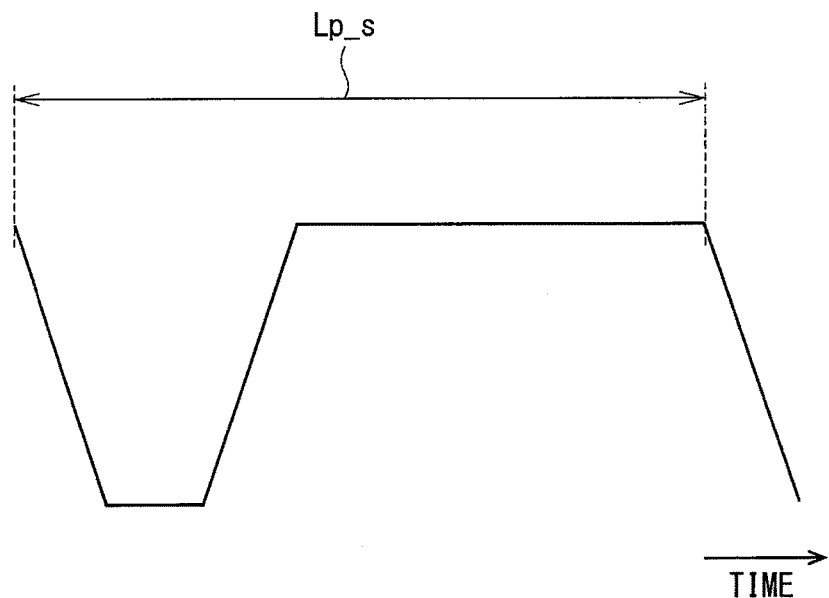
FIG. 5A is a diagram illustrating a pulse length of a synchronous signal.

A correction of each signal using the synchronization signal in the correction portion 554 will be explained by referring to FIG. 5A and FIG. 5B. As described above, in order to express data by a time width (a pulse width) between falling edges of pulses, it may be important that a clock of the sensor 10 synchronizes with a clock of the microcomputer 55 in the SENT communication.

In the present embodiment, the correction portion 554 calculates a correction value Ac using the synchronization signal. The correction value Ac is used so as to correct a timing deviation (also referred to as a clock deviation) between the sensor 10 and the microcomputer 55. The number of tick in the synchronization signal (a tick number) is defined as N, and the pulse length of the synchronization signal outputted from the sensor 10 is defined as Lp_s, as described in FIG. 5A. The correction value Ac is calculated by the following expression 1:

$$Ac=Lp\_s/(N \times Tt) \qquad \text{Expression 1.}$$

Figure 5B:
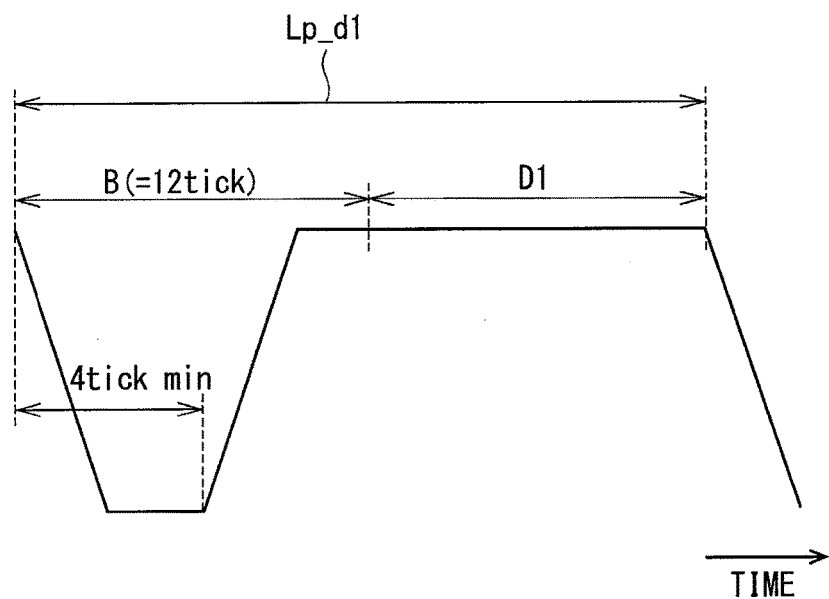
FIG. 5B is a diagram illustrating correction of a data signal of the first embodiment.

As described in FIG. 5B, regarding the first data signal, the correction portion 554 corrects the pulse length Lp_d1 with the correction value Ac, and calculates an actual data D1 of the first data signal that is expressed by the tick number. Regarding the second data signal, the correction portion 554 corrects the pulse length Lp_d2 with the correction value Ac, and calculates an actual data D2 of the second data signal that is expressed by the tick number.

In the present embodiment, a tick number exceeding a reference tick number B (for example, B is equal to 12 ticks) shows each data.

The actual data D1 of the first data signal is expressed by the Expression 2-1:

$$D1=\text{Round}[\{(Lp\_d1/Ac)-B \times Tt\}/Tt] \qquad \text{Expression 2-1.}$$

The actual data D2 of the second data signal is expressed by the Expression 2-2:

$$D2=\text{Round}[\{(Lp\_d2/Ac)-B \times Tt\}/Tt] \qquad \text{Expression 2-2.}$$

Incidentally, the Round function in these expressions means rounding off.

The state signal and the CRC signal are also calculated in a similar way.

As explained in FIG. 1 and FIG. 2, the output of the trigger signal St from the ECU 40 to the sensor 10 and the output of the output signal Sd1 from the sensor 10 to the ECU 40 both use the communication line 63 in common.

Therefore, the microcomputer 55 receives the output signal Sd1 that should be acquired following the synchronization signal, and a pulse of the trigger signal St that is unnecessary to be received. So that the microcomputer 55 does not acquire the trigger signal St, for example, an input-and-output port of the microcomputer 55 may be made invalid temporarily each time when the ECU 40 outputs an instruction for outputting the trigger signal St. In this case, a load on the microcomputer 55 may increase. Since it may be necessary to consider a switchover time of validity/ invalidity of the input-and-output port, it may take more time to perform communication.

In the present embodiment, the microcomputer 55 uses a feature that the first data signal and the second data signal are outputted after the synchronization signal, the first signal data and the second signal data being required for various calculations. The microcomputer 55 determines whether a pulse after receiving the end signal corresponds to the synchronization signal or not. The microcomputer 55 skips a pulse other than the synchronization signal. Also, when the microcomputer 55 receives the synchronization signal, the microcomputer 55 reads a series of signals following the synchronization signal to the end signal as the output signal Sd1.

Figure 6:
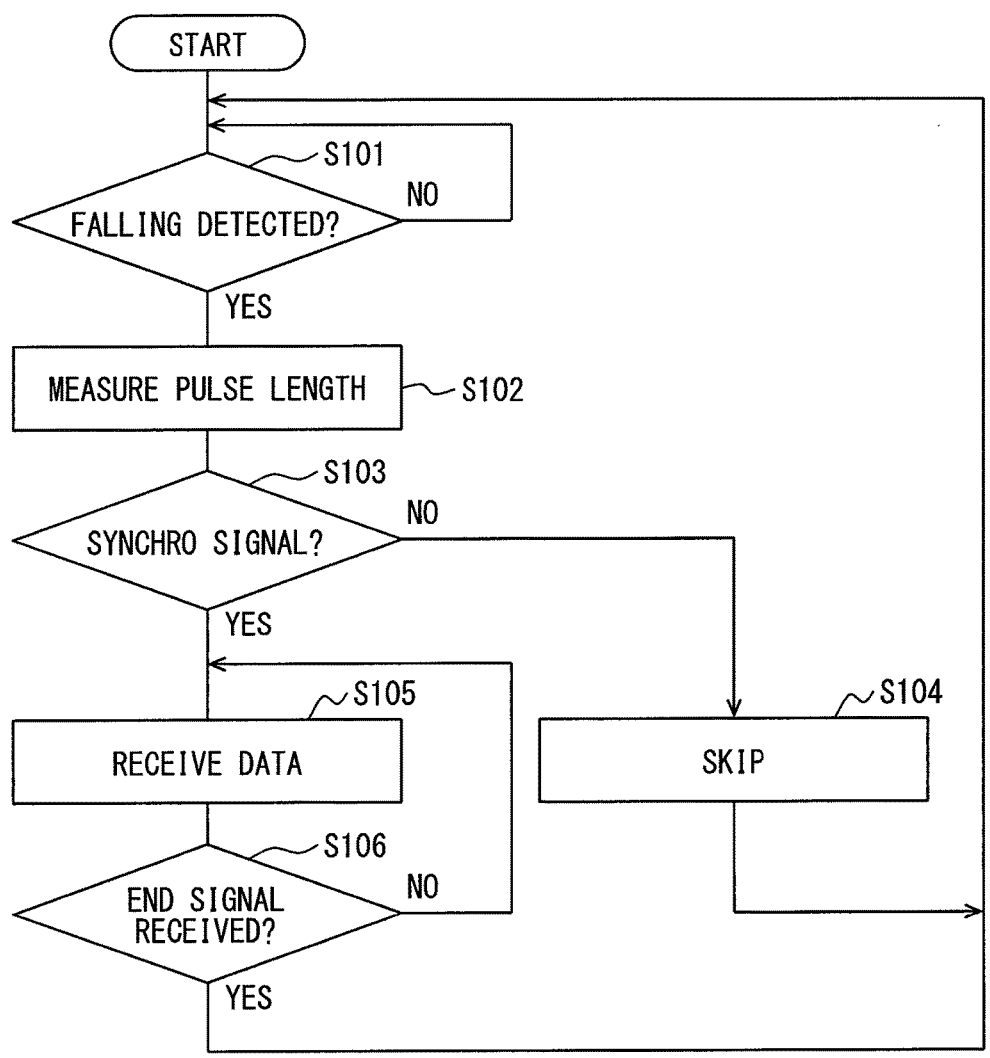
FIG. 6 is a flowchart illustrating a communication processing of the first embodiment.

The communication processing in the microcomputer 55 of the present embodiment will be explained with referring to a flowchart of FIG. 6. The communication processing is executed when the sensor 10 and the microcomputer 55 turn on.

In S101, it is determined whether a falling of the pulse (also referred to as a falling pulse) is detected. When the falling of the pulse is not detected (S101: NO), S101 is repeated. When the falling of the pulse is detected (S101: YES), the processing shifts to S102.

In S102, the measuring portion 551 measures the pulse length Lp corresponding to a time period from the previous falling of a pulse to the present falling of a pulse.

In S103, the signal determination portion 552 determines whether the received pulse is the synchronization signal based on the measured pulse length Lp. In the present embodiment, when the measured pulse length Lp is within a predetermined range including the pulse length Lp_s of the synchronization signal (in the present embodiment, 168 microseconds), it is determined that the received pulse is the synchronization signal. When it is determined that the received pulse corresponds to the synchronization signal (S103: YES), the processing shifts to S105. When it is determined that the received pulse is not the synchronization signal (S103: NO), the processing shifts to S104.

In S104, the received pulse is skipped, and the processing returns to S101.

As mentioned above, when it is determined that the received pulse is the synchronization signal (S103: YES), the processing shifts to S105. In S105, the signal acquisition portion 553 detects a series of signals following the received synchronization signal to the end signal as the output signal Sd1, and performs data receiving.

In S106, it is determined whether the end signal is received or not. When it is determined that the end signal has not been received (S106: NO), the processing shifts to S105, and the data receiving is performed. When it is determined that the end signal has been received (S106: YES), the processing shifts to S101.

A specific example of the communication processing will be explained with referring to the timing chart of FIG. 7. In the present embodiment, it is supposed that the microcomputer 55 does not switch over between validity/invalidity of the input-and-output port, and that voltage of the internal communication line 46 is received at all times.

The microcomputer 55 becomes a synchronizing signal standby state after receiving the end signal. In this case, it is supposed that the microcomputer 55 receives a pulse N1 which is a noise pulse. It is supposed that a pulse length Lp_n1 of the pulse N1 is equal to, for example, 10 microseconds. In this case, since the pulse length Lp_n1 is different from the pulse length Lp_s (being equal to 168 microseconds) of the synchronization signal, the microcomputer 55 considers that the pulse N1 is not the synchronization signal, and skips the pulse N1.

It is supposed that the microcomputer 55 receives a pulse N2 in the synchronizing signal standby state. The pulse N2 is the trigger signal St. And, it is supposed that a pulse length Lp_n2 of the pulse N2 is equal to 50 microseconds. In this case, since the pulse length Lp_n2 is different from the pulse length Lp_s of the synchronization signal, the microcomputer 55 considers that the pulse N2 is not the synchronization signal, and skips the pulse N2.

Further, it is supposed that the microcomputer 55 receives the pulse S1, which is the synchronization signal, after receiving the trigger signal St (the pulse N2). In this case, since the pulse length Lp_s1 of the pulse S1 is within a predetermined range including 168 microseconds, the microcomputer 55 considers the pulse S1 as the synchronization signal. The signal acquisition portion 553 reads a series of signals following the pulse S1 to the end signal as the output signal Sd1.

In the present embodiment, the microcomputer 55 determines whether a pulse received after receiving the end signal corresponds to the synchronization signal or not based on the pulse length Lp. When it is determined that the pulse received after receiving the end signal does not correspond to the synchronization signal, the pulse is skipped. That is, in the present embodiment, without performing a switchover of the input-and-output port of the microcomputer 55, the noise and the trigger signal St are simply skipped. Accordingly, without increasing arithmetic load on the microcomputer 55, it may be possible to prevent an error from occurring due to false determination of the microcomputer 55 in which the microcomputer wrongly determines the noise and/or the trigger signal St as a signal outputted from the sensor 10.

As described above, the communication apparatus 1 includes the sensor 10 and the ECU 40.

The sensor 10 outputs the synchronization signal, the data signal, and the end signal in this order as the output signal Sd1. Incidentally, the synchronization signal is a signal for synchronizing clocks. The data signal is outputted after the synchronization signal. The end signal is a signal that is outputted after the data signal and indicates a termination of a series of signals. As long as the synchronization signal, the data signal, and the end signal are arranged in this order, another signal may be included between the synchronization signal and the data signal and/or between the data signal and the end signal. Another signal corresponds to a state signal and the CRC signal in the present embodiment. In the present embodiment, the data signal is expressed by a nibble.

The microcomputer 55 of the ECU 40 has the measuring portion 551, the signal determination portion 552, and the signal acquisition portion 553.

The measuring portion 551 measures the length of the received pulse.

The signal determination portion 552 determines based on the length of a pulse whether the received pulse corresponds to the synchronization signal.

The signal acquisition portion 553 skips the pulse when determining that the received pulse does not correspond to the synchronization signal. When the signal acquisition portion 553 determines that the received pulse corresponds to the synchronization signal, the signal acquisition portion 553 considers that the pulse following the pulse to the end signal corresponds to the output signal Sd1, and reads the pulse.

According to the present disclosure, the synchronous signal is transmitted before transmission of the data signal. Thus, by using this feature, it is determined whether the received pulse corresponds to the synchronous signal or not based on the pulse length Lp. When determined that the received pulse does not correspond to the synchronous signal, the received signal is skipped. Accordingly, it may be possible to properly skip a noise and a signal that is unnecessary to be read, such as a trigger signal St. It may be possible to properly acquire the output signal Sd. In addition, it may be possible to prevent an error from occurring due to reading the unnecessary signal and the noise and to properly maintain communication. Further, in comparison with a case where an unnecessary signal and a noise are not acquired by the switchover of an input-and-output portion, it may be possible to reduce a load on the ECU 40.

The ECU 40 includes a trigger signal generation portion 47. The trigger signal generation portion 47 outputs to the sensor 10, the trigger signal St that requires the sensor 10 to output the output signal Sd1.

The sensor 10 outputs the output signal Sd1 to the ECU 40 according to the trigger signal St.

Accordingly, it may be possible for the ECU 40 to obtain the output signal Sd1 at an intended timing of the microcomputer 55.

The output of the output signal Sd1 from the sensor 10 to the ECU 40 and the output of the trigger signal St from the ECU 40 to the sensor 10 both use the communication line 63 in common.

Accordingly, it may possible to reduce the number of parts and the number of terminals in comparison with a case where the output of the output signal Sd1 and the output of the trigger signal St are performed in different communication lines. Incidentally, when the communication line 63 is used in common, the trigger signal St is also outputted to the microcomputer 55. As described above, since the trigger signal St is skipped, the load on the microcomputer 55 does not increase. Thus, it may be possible to prevent an error from occurring due to a false determination in which the trigger signal St is wrongly determined as the output signal Sd1.

The trigger signal generation portion 47 is configured from a semiconductor element (also referred to as a semiconductor device), and is connected to the communication line 63 and the ground. The trigger signal generation portion 47 is provided by a transistor. The trigger signal generation portion 49 is provided by a diode. When the trigger signal generation portions 47, 49 become conductive to the ground, the electric potential of the communication line 63 is equal to the ground potential. Accordingly, it may be possible to generate the trigger signal St properly.

The trigger signals St are transmitted at a predetermined interval based on a time in the ECU 40. Accordingly, it may be possible that the ECU 40 obtains the output signals Sd1 at the predetermined interval.

The sensor 10 has the sensor elements 21, 22 detecting the change of magnetic field. The data signal is a signal according to the detection signal of the sensor elements 21, 22. Accordingly, it may be possible that the sensor 10 detects the change of the magnetic field suitably. Further, it may be possible that the ECU 40 performs various calculations based on information regarding the change of the magnetic field detected by the sensor 10.

The microcomputer 55 of the ECU 40 has the correction portion 554. The correction portion 554 corrects the first data signal and the second data signal based on the pulse length Lp_s of the synchronization signal. Accordingly, it may be possible to correct a timing deviation of the sensor 10 and the ECU 40, and to properly obtain the first data signal and the second data signal.

A communication method of the present embodiment obtains the output signal Sd1 from the sensor 10. The sensor 10 outputs the synchronization signal for synchronizing clocks, the data signal that is outputted after the synchronization signal, and the end signal that is outputted after the data signal and indicates a termination of the output of the data signal, in this order as the output signal Sd1. The communication method includes a measuring step, a signal determination step, and a signal acquisition step.

The measuring step measures the pulse length Lp of the pulse received by the measuring portion 551.

In the signal determination step, the signal determination portion 552 determines based on the pulse length Lp whether the received pulse corresponds to the synchronization signal.

In the signal acquisition step, when the signal acquisition portion 553 determines that the received pulse does not correspond to the synchronization signal, the received pulse is skipped, and when it is determined that the received pulse corresponds to the synchronization signal, a signal following the received pulse to the end signal is considered as the output signal Sd1 and read.

Accordingly, since the trigger signal St and the noise can be skipped properly, it may be possible to maintain communication without generating an error due to read of the trigger signal St and the noise. Further, it may be possible to reduce the load on the microcomputer 55 in comparison with a case where the microcomputer 55 does not acquire the trigger signal St and the noise by using the switchover of the input-and-output port.

In the present embodiment, the measuring portion 551 corresponds to an example of the measurement step. The signal determination portion (corresponding to a signal determiner) 552 corresponds to an example of the signal determination step. The signal acquisition portion 553 corresponds to an example of the signal acquisition step. The correction portion 554 corresponds to an example of a correction step.

Second Embodiment

A second embodiment of the present disclosure will be explained with referring to FIG. 8A and FIG. 8B. In FIG. 8A and FIG. 8B, the description of the state signal and the CRC signal is omitted.

FIG. 8A corresponds to the first embodiment. When the sensor 10 detects the trigger signal St from the ECU 40, the sensor 10 outputs to the ECU 40, the output signal Sd1 including the synchronization signal (indicated as sync in FIG. 8A), the data signal including the first data signal and the second data signal, and the end signal. That is, in the first embodiment, the microcomputer 55 controls a communication cycle P1 of the output signal Sd1. The sensor 10 is in a state waiting for output until the trigger signal St is detected.

In the second embodiment, as described in FIG. 8B, the sensor 10 outputs the output signal Sd2 including the synchronization signal, the data signal, and a pause signal as the end signal at a predetermined cycle, without the trigger signal St. That is, in the second embodiment, the sensor 10 controls a communication cycle P2 of the output signal Sd2. The microcomputer 55 is in a state waiting for receiving of the synchronization signal after the pause signal is received. In the second embodiment, the microcomputer 55 determines whether a pulse received after receiving the pause signal corresponds to the synchronization signal or not based on the pulse length Lp. When it is determined that the pulse received after receiving the pause signal does not correspond to the synchronization signal, the pulse is skipped. Accordingly, it may be possible to properly skip the noise or the like.

In an asynchronous output in which the sensor 10 controls output timing, it may be possible to shorten a communication cycle by the trigger signal St, in comparison with a synchronous output in which the trigger signal St from the ECU 40 controls the output timing. Further, it may be possible to omit components (parts) according to the output of the trigger signal St in the ECU 40, so that the number of components may decrease.

According to this configuration, a similar effect obtained in the first embodiment will be obtained in the second embodiment.

Other Embodiment

Output Portion

In the present embodiments, a single sensor includes two sensor elements. In another embodiment, the number of sensor element provided into a single sensor may be one, or may be three or more. In the present embodiments, the first data signal and the second data signal according to detection signals of each sensor element are included in the output signal. In another embodiment, the number of the data signal included in the output signal may be any arbitrary number which is one or more.

In the present embodiment, the sensor element is provided by a Hall element. In another embodiment, the sensor element may be a magnetic detection element other than the Hall element, or may be any element detecting change other than magnetism.

In the present embodiments, the output portion is provided by the torque sensor detecting a steering torque. In another embodiment, the output portion may be provided by another sensor (for example, a pressure sensor) other than the torque sensor. The output portion may output to a controller, a signal other than a detection value detected by a sensor element.

(Communication Apparatus)

In the present embodiments, the communication mode between the output portion and the controller is provided by the SENT communication, for example. In another embodiment, the communication mode may be any kinds of communication mode. In the present embodiments, the tick corresponding time is equal to 3 microseconds, the synchronization signal is equal to 56 ticks, the pulse length of the synchronization signal is equal to 168 microseconds, and the pulse length of the trigger signal is equal to 50 microseconds. In another embodiment, as long as the pulse length of the synchronization signal is different from the pulse length of the trigger signal, the tick corresponding time, the tick number of the synchronization signal, the data format, or the like may be determined arbitrarily.

In the present embodiments, the communication apparatus is applied to the electric power steering apparatus. In another embodiment, the communication apparatus may be applied to an onboard apparatus other than the electric power steering apparatus, or may be applied to another apparatus that is not mounted to a vehicle.

Incidentally, it should be noticed that communication in the present disclosure includes a synchronous communication and an asynchronous communication. In the synchronous communication, an output portion outputs an output signal to a controller according to a trigger signal from the controller, as described in the first embodiment. In the asynchronous communication, the output portion outputs the output signal to the controller irrespective of the trigger signal from the controller as described in the second embodiment. Similarly, the above variation can be applied to the disclosure according to the communication method.

It is noted that a flowchart or the process of the flowchart in the present application includes steps (also referred to as sections), each of which is represented, for instance, as S101. Further, each step can be divided into several sub-steps while several steps can be combined into a single step.

While the embodiments, the configurations, the aspects of the communication apparatus and the communication method have been described by way of example, it should be appreciated that embodiments, configurations, aspects of the present disclosure are not limited to the respective embodiments, the respective configurations, and the respective aspects described above. For example, embodiments, configurations, aspects obtained by appropriately combining technical portions disclosed in different embodiments, configurations, and aspects are included within a range of embodiments, configurations, and aspects of the present disclosure.

What is claimed is:

1. A communication apparatus comprising:
an output portion that outputs an output signal which includes a synchronization signal, a data signal, and an end signal, wherein the synchronization Signal synchronizes clocks of a controller and the output portion, the data signal is outputted after the synchronization signal, and the end signal is outputted after the data signal and indicates a termination of a series of signals in this order; and
a controller that includes
(i) a measuring portion that measures a length of a received pulse that is received by the controller,
(ii) a signal determiner that determines based on the length of the received pulse whether the received pulse corresponds to the synchronization signal,
(iii) a signal acquisition portion that skips the received pulse in a case where the signal determiner determines that the received signal does not include the synchronization signal, and
considers the received signal as the synchronization signal and reads a pulse following the received pulse to the end signal in a case where the signal determiner determines that the received signal includes the synchronization signal, and
(iv) a corrector that corrects the data signal based on a pulse length of the synchronization signal,
wherein:
the corrector calculates the correction value based on the pulse length on the synchronization signal in accordance with a following expression:

$$Ac=Lp\_s/(N \times Tt),$$

in which Ac represents the correction value, Lp_S represents the pulse length of the synchronization signal outputted from the output portion, N represents a total number of tick in the synchronization signal, and Tt represents a time corresponding to on tick; and
the pulse length of the data signal is corrected by the correction value so as to calculate the actual data of the data signal in accordance with a following expression:

$$D1=\text{Round}[\{(Lp\_d1/Ac)-B\times Tt\}/Tt],$$

in which D1 represents the actual data, Lp_dl represents the pulse length of the data signal, and B represents a reference tick number.

2. The communication apparatus according to claim 1, wherein:
the controller further includes a trigger signal generator;
the trigger signal generator outputs to the output portion, a trigger signal that requires the output portion to output the output signal; and
the output portion outputs the output signal to the controller when receiving the trigger signal.

3. The communication apparatus according to claim 1, further comprising:
the output portion includes a sensor element detecting change of magnetic field; and
the data signal corresponds to a detection signal of the sensor element.

4. The communication apparatus according to claim 1, wherein:
the data signal is expressed by nibble.

5. The communication apparatus according to claim 2, further comprising:
a communication line connecting the output portion and the controller,
wherein:
an output of the output signal transferred from the output portion to the controller and an output of the trigger signal transferred from the controller to the output portion are performed in the communication line in common.

6. The communication apparatus according to claim 2, wherein:
the controller further includes a timer; and
the trigger signal generator transmits the trigger signal at a predetermined interval based on the timer.

7. The communication apparatus according to claim 2, wherein:
the pulse length of the synchronization signal is equal to 168 microseconds;
the pulse length of the trigger signal is equal to 50 microseconds.

8. The communication apparatus according to claim 5, wherein:
the trigger signal generator includes a semiconductor element; and
the trigger signal generator is connected to both of the communication line and a ground.

9. The communication apparatus according to claim 8, wherein:
the semiconductor element includes a transistor or a diode.

10. A communication method that acquires an output signal outputted from an output portion, the output signal including a synchronization signal which synchronizes clocks, a data signal which is outputted after the synchronization signal, and an end signal which is outputted after the data signal and indicates a termination of a series of signal as the output signal in this order, the communication method comprising:
measuring a length of a received pulse received;
determining whether the received pulse includes the synchronization signal based on the length of the received pulse;
skipping the received pulse in a case where the received pulse is determined not to be the synchronization signal;
considering a pulse following the received pulse to the end signal as the output signal and reads the pulse following the received pulse to the end signal in a case where the received pulse is determined to be the synchronization signal; and
correcting the output signal based on a pulse length of the synchronization signal,
wherein:
in the correcting the output signal, calculating the correction value based on the pulse length of the synchronization signal in accordance with a following expression:

$$Ac=Lp\_s/(N\times Tt),$$

in which Ac represents the correction value, Lp_S represents the pulse length of the synchronization signal outputted from the output portion, N represents a total number of tick in the synchronization signal, and Tt represents a time corresponding to on tick; and
correcting the pulse length of the data signal based on the correction value so as to calculate the actual data of the data signal in accordance with a following expression:

$$D1=\text{Round}[\{(Lp\_d1/Ac)-B\times Tt\}/Tt],$$

in which D1 represents the actual data, Lp_dl represents the pulse length of the data signal, and B represents a reference tick number.

* * * * *

UNITED STATES PATENT AND TRADEMARK OFFICE
CERTIFICATE OF CORRECTION

PATENT NO.       : 9,692,562 B2  
APPLICATION NO.  : 15/086601  
DATED            : June 27, 2017  
INVENTOR(S)      : Takaharu Kozawa It is certified that error appears in the above-identified patent and that said Letters Patent is hereby corrected as shown below:

On the Title Page

Item (73), (Assignee) at Line 1, Change "DENSON" to --DENSO--.

In the Claims

In Column 12 at Line 31, In Claim 1, change "Signal" to --signal--.

Signed and Sealed this  
Seventeenth Day of October, 2017

Joseph Matal  
*Performing the Functions and Duties of the*  
*Under Secretary of Commerce for Intellectual Property and*  
*Director of the United States Patent and Trademark Office*